Patented July 25, 1933

1,919,773

UNITED STATES PATENT OFFICE

ERNEST CHAPMAN, OF MANCHESTER, ENGLAND, ASSIGNOR TO IMPERIAL CHEMICAL INDUSTRIES LIMITED, A CORPORATION OF GREAT BRITAIN

INDOPHENOLS AND SULPHUR DYESTUFFS THEREFROM

No Drawing. Application filed October 10, 1931, Serial No. 568,204, and in Great Britain October 25, 1930.

This invention relates to the production of indophenols or leuco-indophenols and to the use thereof in the production of sulphur dyestuffs of novel shade and excellent fastness properties.

According to the invention I oxidize together a phenolic amino compound such as p-amino-phenol and a tetralkyl-indoline of the general formula

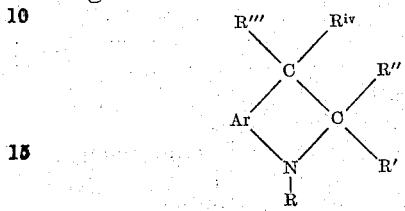

(wherein Ar represents an ortho-arylene radical devoid of substituent in the position para to the —NR— group, R may be hydrogen or a hydrocarbon radical, and R', R", R''' and $R^{iv}$ are aliphatic hydrocarbon radicals, the same as or different from one another). I may also effect interaction between the said tetralkylindolines and a 1:4-nitrosophenol or a quinone chlorimide, to give a highly coloured indophenol.

The so-obtained indophenols are readily converted by reduction processes into the corresponding leuco compounds.

According to a further feature of the invention, the new indophenols or their leuco compounds are treated with sulphurizing agents to give sulphur dyestuffs of valuable green to blue shades and excellent fastness properties, particularly fastness to chlorine.

The invention is illustrated, but not limited, by the following examples, in which the parts are by weight:

Example 1

17.5 parts of 2:2:3:3-tetramethylindoline are dissolved by warming in 80 parts of water containing 19 parts of hydrochloric acid of specific gravity 1.18. The cooled solution is then mixed with one containing 14.6 parts of p-aminophenol hydrochloride in 120 parts water. The mixture is cooled to 0° C. and 24.5 parts of hydrochloric acid of specific gravity 1.18 and 600 parts of ice are added. With vigorous stirring an ice cold solution of 20 parts of crystalline sodium dichromate in 120 parts water is added. The indophenol is produced almost immediately. It is reduced to the leuco compound directly by addition of 20 parts of zinc dust, sufficient hydrochloric acid (35–40 parts) being added to keep the mixture feebly mineral acid in reaction to test papers. After stirring for some time the solution is heated to 90° C. and soda ash is added until the liquor is alkaline. The solution is filtered whilst still hot, and the solid matter is well washed, preferably with water containing a little sodium sulphide (to prevent oxidation). The entire liquor is cooled, and the free leuco indophenol is isolated by adding 24 parts of sodium bicarbonate and followed by saturation with carbon dioxide.

The leuco indophenol dissolves in dilute caustic soda to give a deep red solution which turns blue on exposure to air. It has the following probable formula:

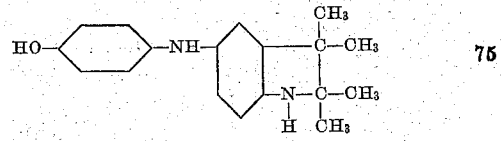

9 parts of the leuco indophenol obtained as above are added to a solution of sodium polysulphide prepared from 8.1 parts sodium sulphide (60%), and 12 parts of sulphur, in 30 parts of methylated spirits. The mixture is boiled under reflux with stirring for about 70 hours, after which the methylated spirit is removed by distillation, about 30 parts of water being simultaneously run in.

The dyestuff may be isolated by blowing air through the liquor or by acidification. It may be purified, if desired, by dissolving in sodium sulphide solution and reprecipitation.

When applied in the usual way of sulphur dyestuffs it dyes cotton in greenish blue shades of good fastness to light and of outstanding chlorine fastness.

The product dyes cotton in a somewhat greener shade when the sulphurization described above is carried out in the presence of copper or a salt thereof.

Example II 9.45 parts of Bz-methyl-2:2:3:3-tetramethylindoline (obtained by reduction of acetone-m-tolil, the position of the Bz-methyl group being unknown) are dissolved in 45 parts of warm water containing 4.6 parts sulphuric acid. This solution is cooled to 0° C., and added to an ice cold solution of 7.3 parts of p-aminophenolhydrochloride in 60 parts of water. After the addition of a mixture of 6.45 parts of sulphuric acid, 7 parts of water and 300 parts of ice, an ice cold solution of 10 parts of sodium dichromate in 60 parts of water is run in quickly, followed by 10 parts of zinc dust, with vigorous stirring. Concentrated hydrochloric acid is added to keep the mixture just acid (about 20 parts being needed) and it is stirred for 40 minutes. The solution is then heated to 90° C. and soda ash 25-30 parts is added till the solution is slightly alkaline to phenol phthalein. 30 parts of sodium sulphide crystals are added and the mixture is filtered whilst hot. The leuco-indophenol is isolated in the manner described in Example 1. It has the following probable formula:

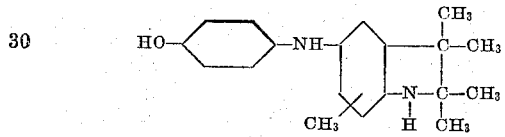

9 parts of the dry leuco indophenol so obtained are sulphurized in the manner described in Example 1.

The dyestuff obtained dyes cotton in greenish blue shades.

Similar products are obtained when the isomeric 2:2:3:37-pentamethylindoline (from acetone-o-tolil) is used.

Since many embodiments of this invention, differing widely in one or more respects, may be made without departing from the spirit of my invention, it is to be understood that I do not limit myself to the foregoing examples or description except as indicated in the following claims:

I claim:

1. In the process of preparing indophenols, the step which comprises oxidizing a tetralkylindoline of the general formula:

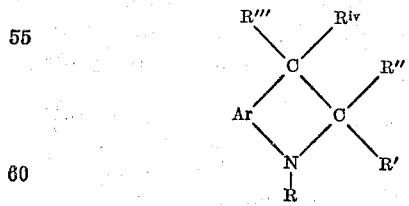

in which Ar represents an ortho-arylene radical devoid of substituent in the position para to the —NR— group, R represents hydrogen or a hydrocarbon radical, and R', R", R''' and R$^{iv}$ represent aliphatic hydrocarbon radicals which may be the same as or different from one another, together with a compound of the group consisting of p-amino-phenol, 1:4 nitrosophenol, and quinone chloro-imides.

2. In the process of preparing indophenols, the steps which comprise oxidizing a tetralkylindoline of the general formula:

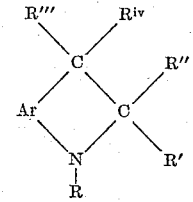

in which Ar represents an ortho-arylene radical devoid of substituent in the position para to the —NR— group, R represents hydrogen or a hydrocarbon radical, and R', R", R''', and R$^{iv}$ represent aliphatic hydrocarbon radicals which may be the same as or different from one another, together with a compound of the group consisting of p-amino-phenol, 1:4 nitrosophenol, and quinone chloro-imides, and thereafter forming the leuco derivative by reducing the indophenol formed in the oxidation step.

3. In the process of preparing indophenols, the steps which comprise oxidizing a tetralkylindoline of the general formula:

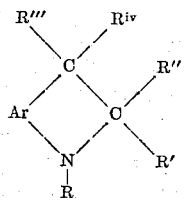

in which Ar represents an ortho-arylene radical devoid of substituent in the position para to the —NR— group, R represents hydrogen or a hydrocarbon radical, and R', R", R''', and R$^{iv}$ represent aliphatic hydrocarbon radicals which may be the same as or different from one another, together with a compound of the group consisting of p-amino-phenol, 1:4 nitrosophenol, and quinone chloro-imides, and thereafter sulphurizing the indophenol formed in the oxidation step.

4. In the process of preparing indophenols, the steps which comprise oxidizing a tetralkylindoline of the general formula:

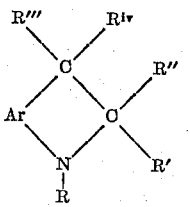

in which Ar represents an ortho-arylene radical devoid of substituent in the position para to the —NR— group, R represents hydrogen or a hydrocarbon radical, and R', R'', R''', and R$^{iv}$ represent aliphatic hydrocarbon radicals which may be the same as or different from one another, together with a compound of the group consisting of p-amino-phenol, 1:4 nitrosophenol, and quinone chloroimides, reducing the indophenol formed in the oxidation step, and thereafter sulphurizing the leuco indophenol formed in the reduction step.

5. The process of producing a new indophenol which comprises oxidizing 2:2:3:3 tetramethylindoline together with p-aminophenol.

6. The process of producing a new indophenol which comprises oxidizing 2:2:3:3 tetramethylindoline together with p-aminophenol, and thereafter reducing the indophenol thus formed.

7. The process of producing a new indophenol which comprises oxidizing 2:2:3:3 tetramethylindoline together with p-aminophenol, and thereafter sulphurizing the indophenol formed by the oxidation step.

8. The process of producing a new indophenol which comprises oxidizing 2:2:3:3 tetramethylindoline together with p-aminophenol, reducing the indophenol thus formed, and thereafter sulphurizing the leuco-indophenol formed by the reduction step.

9. As new products tetra-alkyl-indoline-leuco-indophenols having the following probable formula:

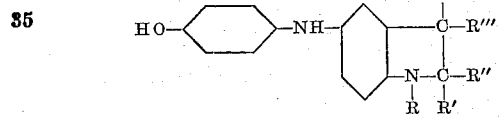

in which R represents hydrogen or a hydrocarbon radical and R', R'', R''', and R$^{iv}$ represent aliphatic hydrocarbon radicals.

10. As new products tetra-alkyl-indoline-leuco-indophenols having the following probable formula:

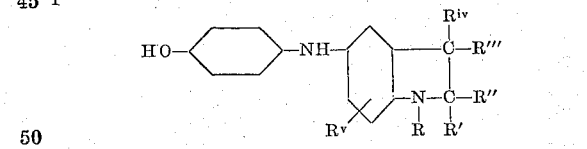

in which R and R$^v$ represent hydrogen or hydrocarbon radicals, and R', R'', R''' and R$^{iv}$ represent aliphatic hydrocarbon radicals.

11. As new products the tetra-alkyl-indoline-indophenols which in the form of their leuco derivatives have the probable formula given in claim 9.

12. As new products the tetra-alkyl-indoline-indophenols which in the form of their leuco-derivatives have the probable formula given in claim 10.

13. As new products the sulphur dyes which are substantially identical with the products obtained by submitting the leuco indophenols described in claim 9 to a polysulphide fusion.

14. As new products the sulphur dyes which are substantially identical with the products obtained by submitting the leuco indophenols described in claim 10 to a polysulphide fusion.

15. As a new product the tetra-alkyl-indoline-leuco-indophenol having the following probable formula:

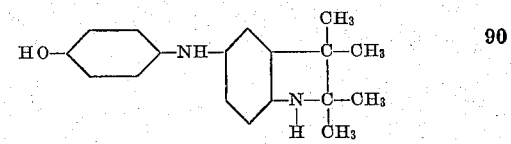

which dissolves in dilute caustic soda to give a deep red solution which turns blue on exposure to air.

16. As a new product the tetra-alkyl-indoline-leuco-indophenol having the following probable formula:

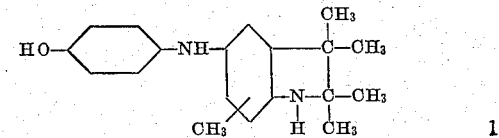

17. As a new product the sulphur dye which is substantially identical with the product obtained by submitting the leuco indophenol described in claim 15 to a polysulphide fusion.

18. As a new product the sulphur dye which is substantially identical with the product obtained by submitting the leuco indophenol described in claim 16 to a polysulphide fusion.

ERNEST CHAPMAN.